United States Patent Office 2,833,825
Patented May 6, 1958

2,833,825
PREPARATION OF ACYLPHENOLS

Allen H. Lewis, Berkeley, Calif., assignor to California Research Corporation, San Francisco, Calif., a corporation of Delaware No Drawing. Application March 22, 1954
Serial No. 417,969

4 Claims. (Cl. 260—592)

This invention relates to a process for producing hydroxyaryl alkyl ketones or acylphenols. More particularly, the invention has to do with a process for producing ring acylated phenols from a carboxylic acid, such as a fatty acid or a naphthenic acid, and phenol involving first the esterification of the phenol in the presence of a small amount of a clay-type cataylst to produce a phenyl ester, followed by the rearrangement or isomerization of the phenyl ester by means of liquid hydrogen fluoride to give the acylphenol.

In copending application Serial No. 400,760, filed by Richard D. Stayner on December 28, 1953, and now abandoned, a method is disclosed and claimed for the preparation of acylphenols by heating a mixture of a carboxylic acid and a phenol in the presence of a clay-type catalyst. The mixture of reaction products produced in accordance with the teaching of the aforesaid application comprises (a) para-acylphenol, (b) ortho-acylphenol, and (c) ester of the phenol and acid employed in the reaction. Following reaction, the mixture is fractionally distilled into the desired components and the ester hydrolyzed into the phenol and the acid, the phenol and the acid, if desired, being returned to the reaction zone.

It has now been found in accordance with the present invention that the esterification of the phenol, rather than acylation of the phenolic ring, can be made selective, or can be favored, so that the formation of the phenyl ester greatly predominates over the formation of other acylated products. The phenyl ester can then be rearranged to, or converted into, the acylphenol by means of substantially anhydrous liquid hydrogen fluoride in yields approaching theoretical. Practice of the present invention, therefore, results in an efficient process of producing useful acylphenols in high yields, such as para-lauroylphenol, which are particularly useful in the preparation of detergent compositions, i. e., as additives in detergent compositions for improving the foam characteristics thereof.

The present invention is predicated on the discovery that the heating at moderately elevated temperatures of a mixture of (1) a phenol or phenolic material having the position ortho or para to a hydroxyl group unsubstituted, and (2) a suitable carboxylic acid, such as lauric acid, in the presence of a considerably smaller amount of a clay-type catalyst than heretofore employed favors the formation of the phenyl ester with consequent suppression of the formation of other less desirable acylated phenol compounds. It has moreover been ascertained that the desired acylphenol can then be prepared from the phenyl ester almost quantitatively by treating the said ester with substantially anhydrous liquid hydrogen fluoride, as more fully hereinafter to be shown.

In general, the reactions involved in the steps of the process of the present invention may be illustrated as follows:

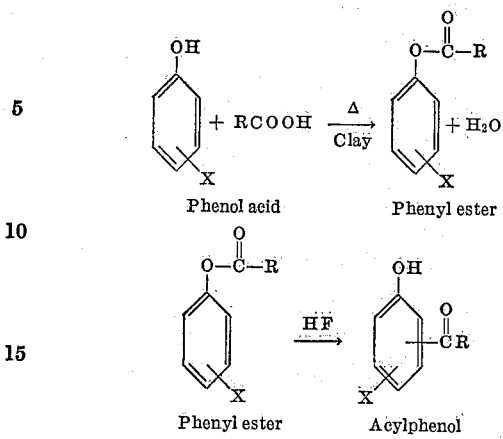

Phenol acid     Phenyl ester

Phenyl ester     Acylphenol

In the above equations "X" represents hydrogen or a substituent group, hereinafter more fully defined. When "X" is a substituent group not occupying the para position with respect to the hydroxyl group or is hydrogen, the final product will be a para-acylphenol. On the other hand, when the para position is occupied and the ortho position is unsubstituted, the final product will be an ortho-acylphenol.

More particularly defined, then, the invention contemplates a process which involves (1) heating at a temperature within about the range of 125° C. to 225° C., preferably 150° C. to 200° C., a suitable phenol and an appropriate carboxylic acid in the presence of about 0.5 to 10, and preferably 1 to 5, weight percent, based on the carboxylic acid, of a clay-type catalyst to produce acylated reaction products predominating in phenyl ester, said phenol being further characterized by the fact that the ortho or para position to a hydroxyl group is free of a substituent group, and (2) contacting the phenyl ester with substantially anhydrous liquid hydrogen fluoride (less than 5 percent by weight of water), preferably at room temperatures, to rearrange the phenyl ester to the acylphenol compound.

In carrying out the process of the invention, it has been found that the reaction proceeds satisfactorily at temperatures of the order of 25° C.–30° C., i. e., about room temperatures and below, for example, down to about 0° C. At these temperatures the reaction proceeds at substantially atmospheric pressure. Higher temperatures, for example, of the order of 50° C. to about 100° C. are also operative, with pressure brought to bear on the reactants to maintain the hydrogen fluoride in liquid state.

In general, it is preferred to operate with a molar excess of hydrogen fluoride over the phenyl ester, that is, with about at least 6 moles of hydrogen fluoride for each mole of phenyl ester. Lesser amounts of liquid hydrogen fluoride of the order of about 3 moles of hydrogen fluoride per mole of phenyl ester can be used, but these tend to reduce reaction rate. On the other hand, greater amounts of hydrogen fluoride, from about 6 up to, for example, 30 moles of hydrogen fluoride per mole of phenyl ester, tend to increase yields.

In the ester formation step, while stoichiometric amounts of phenol and acid can be used, in general it is preferred to employ an excess of phenol over the acid to increase reaction rate and assure the completeness of reaction of the carboxylic acid. Amounts ranging from about 1.5 to 5 moles phenol per mole of acid are satisfactory, amounts of 2 to 3 moles of phenol per mole of acid being especially useful.

As hereinabove stated, a suitable phenolic material is one that has free or unblocked ortho or para position in respect to a hydroxyl group. Accordingly, the phenolic ring nucleus can be a benzene or naphthalene ring having substituents, such as additional hydroxyl group, alkyl and alkoxy groups or radicals. Examples of these materials are phenol itself (monohydroxybenzene), which is preferred; the cresols, such as ortho, meta and para cresols; polyhydric phenols, such as pyrocatechol, resorcinol, pyrogallol, naphthols, such as α-naphthol and β-naphthol, resorcinol monomethyl ether, and the like.

A suitable carboxylic acid employed in accordance with the invention can be a saturated monobasic or polybasic acid having about 2 to 25 carbon atoms. Also suitable are mono- and polybasic aromatic carboxylic acids, for example, benzoic acid, isophthalic acid, terephthalic acid, trimesic acid, pyromellitic acid and the like. Substituted aromatic carboxylic acids, such as toluic acid and the higher alkyl benzoic acids can be employed in accordance with the invention. In general the group represented by "R" in the above equations can be an alkyl group of 1 to 24 carbon atoms or an aromatic radical such as phenyl or naphthyl, or phenyl or naphthyl substituted with an alkyl group or a carboxyl group. The preferred acid material, however, is a saturated aliphatic monobasic acid of 7 to 18 carbon atoms, including cycloaliphatic acids, i. e., naphthenic acids, such as those derived from petroleum; the fatty acids, for example, acetic, caproic, caprylic, pelargonic, capric, undecylic, lauric, myristic, palmitic, stearic, nondecylic, behenic, etc.

The catalysts contemplated by the process of the invention may be defined as clay-type catalysts having high surface area and surface acid centers. Suitable clay-type catalysts are those which are effective in catalytic cracking of hydrocarbons and in the decolorizing of lubricating oils and vegetable oils. These catalysts may be either naturally-occurring silica-alumina clays, preferably activated by acid treating, or synthetic clay-type cracking catalysts. Particularly useful is Super-filtrol clay which is a montmorillonite clay activated by acid washing. Other examples of suitable catalyst materials are naturally-occurring and acid-washed fuller's earth, glauconite, and Attapulgus clay. Examples of synthetic silica-base cracking catalysts useful in the present invention are silica-alumina, silica-magnesia, silica-zirconia, and silica-thoria.

In carrying out the process of the invention suitable apparatus involves a reaction vessel provided with means for stirring and heating. In addition the reaction vessel is provided with a condenser and water trap for the accumulation of water which distills over during the reaction of the phenol and acid. The reaction between phenol and acid may be carried out under an inert atmosphere, such as nitrogen, to prevent oxidation of the phenol. Following the reaction, which usually takes 1 to 4 hours, or when no further water distills over, the contents of the reaction vessel are filtered to remove the catalyst.

The filtrate comprising substantially all phenyl ester is then contacted with liquid hydrogen fluoride, preferably in a closed vessel, such as an autoclave, the reactants being maintained under pressure if needed to maintain the hydrogen fluoride in the liquid state. Following completion of the rearrangement step, which is indicated by analysis of a small sample of product by water washing and distilling, the acylphenol compound is recovered. Conveniently, the recovery of the acylphenol may be effected by raising the temperature of the reaction mixture whereby hydrogen fluoride is taken off directly, followed by steam-stripping of the residue to remove excess phenol. If desired, the acylphenol can be further refined or purified, such as by distillation or crystallization from a suitable solvent, e. g., hexane, an alcohol, such as ethyl alcohol, or mixtures of solvents. Another method for the recovery of the acylphenol comprises pouring the reaction mixture of the rearrangement step over ice, whereby the hydrogen fluoride dissolves in water, leaving a crystalline mass which can further be refined, as by crystallization with a suitable solvent, e. g., hexane, and the like.

The following examples are given further to illustrate the process of the present invention.

*Example 1*

(a) A mixture of 95 parts by weight of phenol, 100 parts by weight of lauric acid and 2 parts by weight of Super-filtrol clay under an atmosphere of nitrogen was stirred in a reaction vessel at a temperature between about 180° C. and 200° C. for 3 hours. During the reaction water was distilled from the reaction mixture until a total of about 10 parts by weight of water was obtained. Some phenol which was distilled over with the water, was condensed, dried and returned to the reaction zone. The reaction mixture was cooled down to a temperature of about 125° C., and then filtered on a suction filter to remove the clay. Analysis of a small portion of the filtrate indicated that essentially all the lauric acid was consumed in the reaction. The filtrate was fractionally distilled to remove excess phenol and to obtain a fraction containing phenyl laurate boiling between 160° C. and 230° C. at 2 mm. Hg. This fraction was analyzed by hydrolysis and distillation and found to contain 91 weight percent of phenyl laurate, 3.5 weight percent of ortho-acylphenol, and 5.5 weight percent of para-acylphenol.

(b) About 50 parts by weight of phenyl laurate prepared as described in (a) was charged to an autoclave together with 76.5 parts by weight of substantially anhydrous liquid hydrogen fluoride and 17 parts of phenol, the mixture being maintained at 25° C. for a period of 24 hours. After this period the reaction mix was poured over ice, whereupon a crystalline mass was formed. The crystalline mass was then recrystallized from a mixture of hexanes. About 47.5 parts of para-lauroylphenol representing a 95% yield, was obtained. The para-lauroylphenol had a melting point of 71.2 to 71.6° C.

*Example 2*

A number of preparations of phenyl laurate employing the procedure, reactants, and the catalyst of Example 1, were made to illustrate the effect of varying the amount of catalyst. In these runs reaction temperatures were held between 180–200° C., the time of reaction being 4 hours. In all of the runs an excess of phenol in a molar ratio of phenol to lauric acid of 2 to 1 was employed. When employing 10 parts by weight of catalyst per 100 parts by weight of acid, the phenyl ester was obtained in a yield of 78% of theory, the yield of undesirable ortho-lauroylphenol being 8%. In another run employing 15 parts by weight of catalyst for every 100 parts of fatty acid the yield of phenyl laurate decreased to 65 weight percent, while the yield of undesirable ortho-lauroylphenol increased to 15%. When using 25 parts by weight of catalyst for every 100 parts by weight of fatty acid, the yield of phenyl ester was further decreased to 60 weight percent, while the yield of ortho-lauroylphenol increased to 19 weight percent. In Example 1 it will be noted that a yield of only 3.5 weight percent of ortho-lauroylphenol resulted when only 2 parts by weight of catalyst per 100 parts by weight of acid were employed. In all instances yields are based on the weight of acid charged.

*Example 3*

This example illustrates the improvement obtainable when an excess of phenol is employed in the rearrangement step. The procedure followed herein was the same as outlined in Example 1(b). In both runs the temperature of rearrangement was about 25° C., and the time 6 hours. In one run there were employed 80 parts by weight of phenyl laurate and 60 parts by weight of anhydrous liquid hydrogen fluoride, no phenol being present during the rearrangement. In this run a yield of 55 weight percent para-lauroylphenol was obtained, there remaining 41 weight percent of unconverted phenyl laurate. In another run wherein 10 parts of phenol were present in addition, a yield of 74 weight percent para-lauroylphenol was obtained, there remaining 24 weight percent of unconverted phenyl laurate.

*Example 4*

Example 1(a) was repeated except that there was employed 5 parts by weight of a synthetic silica alumina catalyst containing about 13 percent alumina and 87 percent silica (Davison). A yield of 83 weight percent phenyl laurate ester was obtained.

*Example 5*

A mixture of 108 parts by weight of ortho-cresol, 97 parts by weight of stearic acid and 3 parts by weight of Super-filtrol clay, all under an inert atmosphere of nitrogen, was stirred at a temperature between about 185° C. and 200° C. During reaction water was distilled from the reaction mixture. When water ceased to form, the reaction was deemed complete. The reaction mixture was then cooled down to a temperature of about 130° C.–135° C., whereupon it was filtered on a suction filter to remove the clay. The filtrate of ortho-cresyl stearate containing excess ortho-cresol was used directly in the following step.

About 100 parts by weight of the ortho-cresol stearate solution prepared as above was charged to an autoclave with 200 parts by weight of substantially anhydrous liquid hydrogen fluoride, the resulting mixture being maintained at 25° C. for a period of 24 hours. After this period the reaction mix was poured over ice, whereupon a crystalline mass was formed. The crystalline mass was then recrystallized from a mixture of hexanes. About 55 parts of para-stearoyl-ortho-cresol representing a 90 percent yield was obtained.

*Example 6*

Example 5 was repeated except that para-cresol was used in place of ortho-cresol. Ortho-stearoyl-para-cresol was obtained in a yield of 88 percent.

*Example 7*

This example illustrates the effect produced by varying the amount of anhydrous liquid hydrogen fluoride in the rearrangement step contemplated by the process of the invention. The same procedure was followed as in Example 1(b).

About 50 parts by weight of phenyl laurate, 17 parts by weight of phenol, and 13 parts by weight of substantially anhydrous liquid hydrogen fluoride were allowed to stand for 24 hours at 25° C. A yield of about 40 percent of para-lauroylphenol was obtained. Increasing the hydrogen fluoride from 13 parts to 50 parts, the amounts of the oher reactants remaiing the same, gave a yield of para-laurylphenol of 86.5 percent. Similarly, when the hydrogen fluoride was increased from 50 parts to 76.5 parts, a yield of 94 percent para-lauroylphenol was obtained.

*Example 8*

Example 1 was repeated except that resorcinol was employed in an equivalent amount in place of phenol. 4-lauroyl resorcinol was obtained in excellent yield.

While it is preferred to employ less than about 10 percent by weight of clay based on the acid reactant it will be appreciated that when the process is conducted continuously and the clay catalyst is recycled to the reaction zone the catalyst loses activity. In continuous operation of the process, therefor, larger amounts of clay up to 20 percent by weight or higher based on the acid may be employed.

Obviously many modifications and variations of the invention, as hereinbefore set forth, may be made without departing from the spirit and scope thereof and, therefore, only such limitations should be imposed as are indicated in the appended claims.

I claim:

1. A process for the preparation of para-acylphenols, which comprises contacting an ester of a saturated $C_7$–$C_{18}$ fatty acid and phenol with about 6 to 30 mols of substantially anhydrous liquid hydrogen fluoride per mol of the ester at a temperature from about 0° to 30° C. and substantially atmospheric pressure to convert said ester to a product mixture of predominantly $C_7$–$C_{18}$ para-acylphenol, and recovering said para-acylphenol from said product mixture.

2. A process according to claim 1 wherein the ester is derived from a saturated $C_{10}$–$C_{14}$ fatty acid.

3. A process according to claim 1 wherein the reaction is conducted in the additional presence of at least 0.3 mol of phenol per mol of the ester.

4. A process according to claim 1 wherein the ester is phenyl laurate and the recovered product is para-lauroylphenol.

References Cited in the file of this patent

UNITED STATES PATENTS

| | | |
|---|---|---|
| 970,662 | Sulzberger | Sept. 20, 1910 |
| 1,995,402 | Skraup | Mar. 26, 1935 |
| 2,281,942 | Lieber | May 5, 1942 |
| 2,345,006 | Ross | Mar. 28, 1944 |
| 2,346,926 | Lieber | Apr. 18, 1944 |
| 2,442,089 | Lieber | May 25, 1948 |
| 2,542,985 | Bond | Feb. 27, 1951 |
| 2,686,123 | Campbell et al. | Aug. 10, 1954 |
| 2,773,904 | Silverstein | Dec. 11, 1956 |